UNITED STATES PATENT OFFICE.

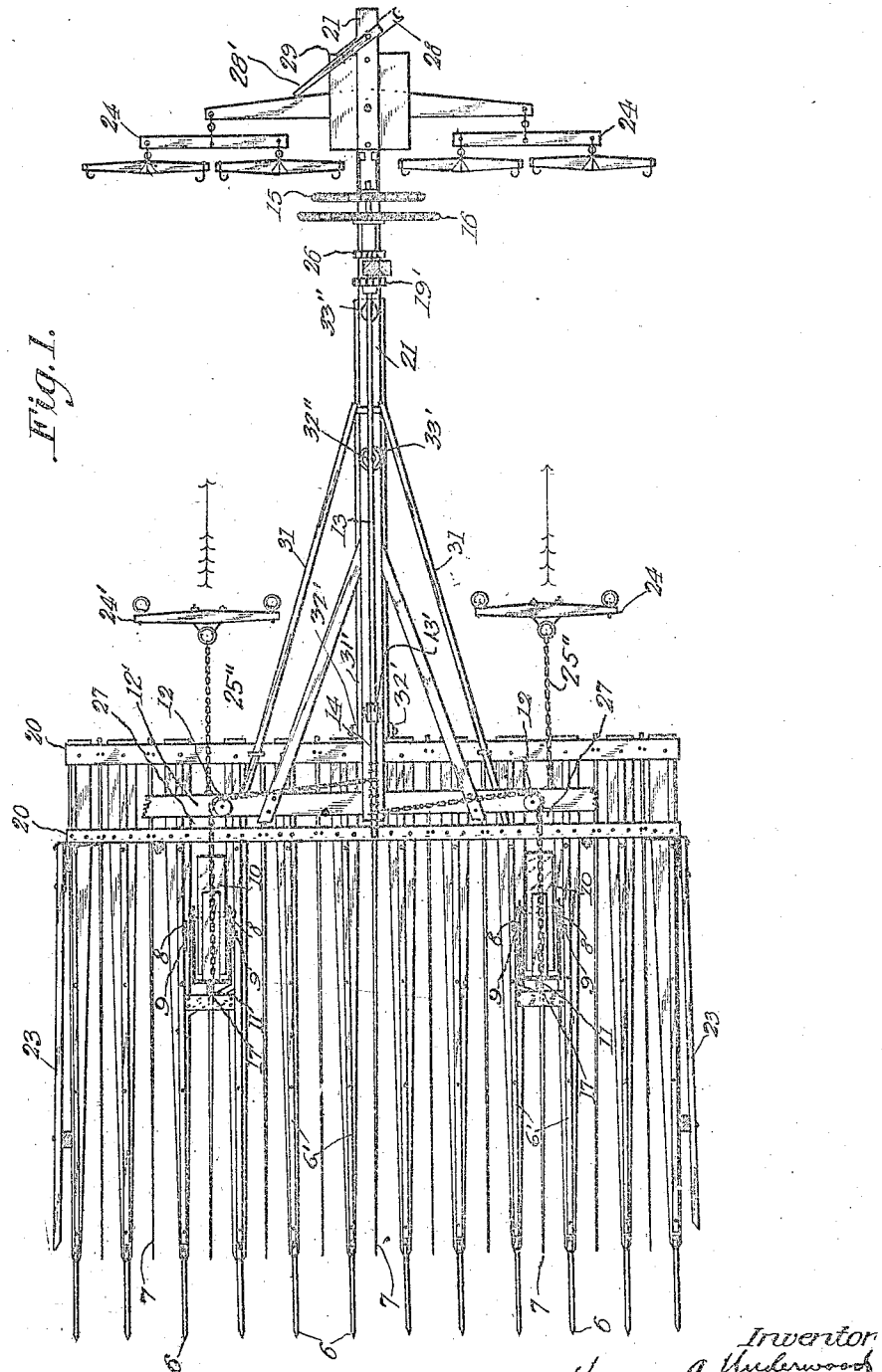

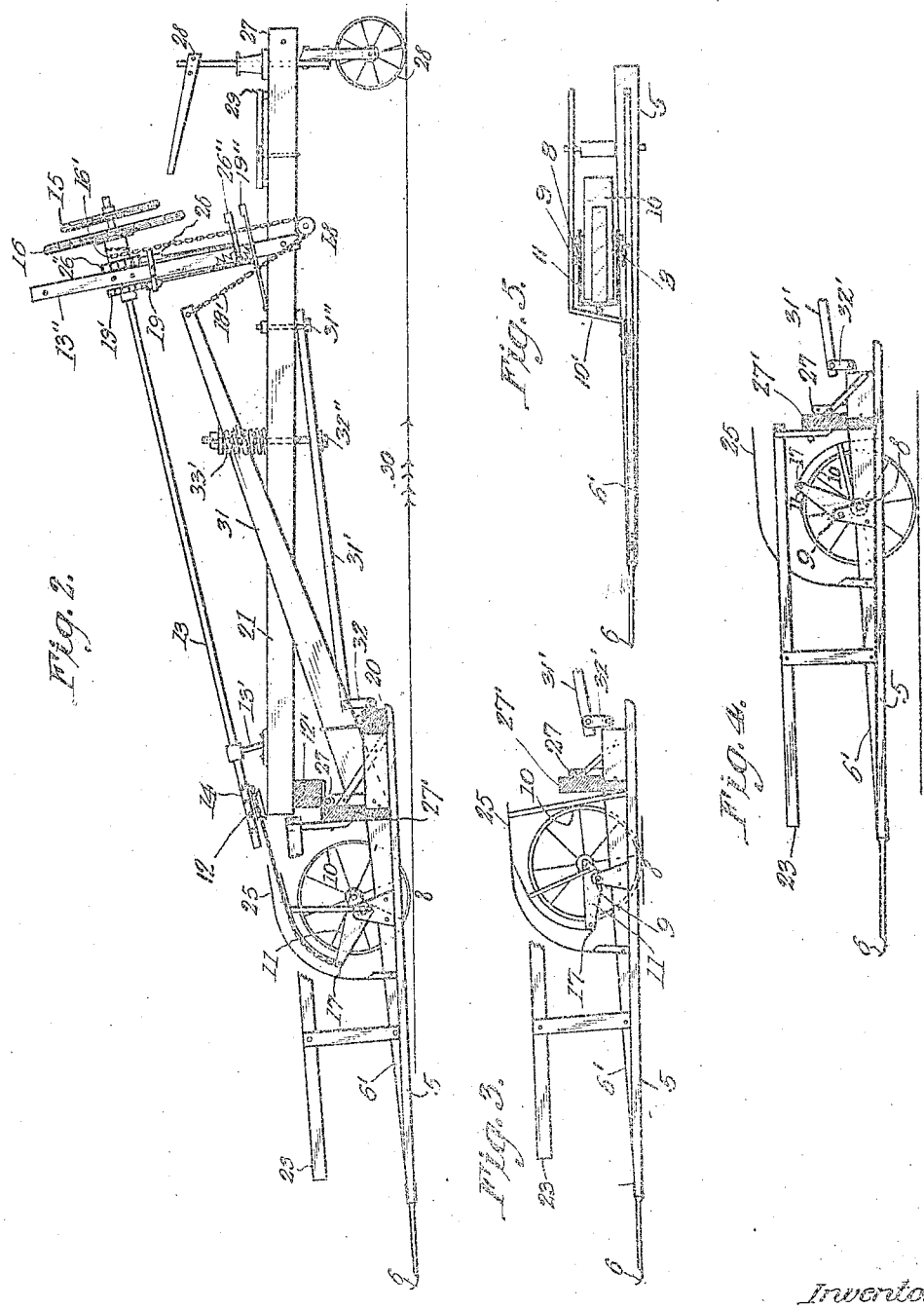

HENRY ARTHUR UNDERWOOD, OF GRAND FORKS, NORTH DAKOTA.

SHOCK AND SHEAF CARRIER.

1,299,875. Specification of Letters Patent. Patented Apr. 8, 1919.

Application filed February 4, 1915. Serial No. 6,121.

*To all whom it may concern:*

Be it known that I, HENRY A. UNDERWOOD, a citizen of the United States, resident of Grand Forks, county of Grand Forks, State of North Dakota, have invented certain new and useful Improvements in Shock and Sheaf Carriers, of which the following is a specification.

The object of my invention is to provide an apparatus by means of which grain can be gathered and transported easily and quickly from the field to the thresher or to any convenient place for stacking or storage, thereby dispensing with teams or wagons and racks usually required for such purpose.

A further object is to provide an apparatus in which the gathering teeth may be lowered to a point near the ground line to collect the bundles thereon and then raised a suitable distance above the ground line.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a shock and sheaf carrying machine embodying my invention, Fig. 2 is a longitudinal sectional view with a portion of the parts broken away, Fig. 3 is a detail sectional view of the rake head and teeth, with parts broken away, Fig. 4 is a view corresponding to Fig. 3, with the carrying teeth in their raised position, Fig. 5 is a plan view, showing the preferred manner of mounting the rake teeth on the supporting wheels.

In the drawing, 5 represents a series of teeth or tines, having elongated metallic points or tips 6, fashioned to slide along the ground when in their lowered position and over any inequalities therein and beneath the bundles or shocks of grain to lift them up from the ground and direct them backwardly upon the carrying teeth. The points 6 are preferably provided with upwardly turned extremities and are tapered toward said extremities and project a considerable distance in front of the teeth, their function being to enter the bundles without breaking or toppling them over, which might be the case were shorter, blunt points employed.

The tines are preferably of wood and have reinforcing strips 6' secured thereon and all of the tines preferably decrease in cross sectional area both vertically and horizontally from their rear toward their forward ends, the rear portions of the tines being substantially rigid to form a support for the sheaves or shocks gathered thereon.

Cross bars 20 and 20' are provided, forming a head for the tines, to which they are suitably secured. Some of the teeth have upwardly projecting brackets 8 thereon, pivotally connected at 9 to yokes 11 which straddle the carrying wheels 10 and have bearings in the hubs thereof on each side. When the yokes are oscillated in vertical planes, the rake head will be raised or lowered with respect to the ground line. Oscillation of the yokes will, through their eccentric connection with the rake head, lower it to a point near the ground and allow the bundles to work back over the teeth to the rear of the rake until the rear portion is loaded. The yokes may then be tilted to lift the loaded rear portion of the rake and cause an accumulation of the bundles on the forward portion thereof until a full rake load has been picked up. This manner of mounting the rake head on its supports I regard as an important feature of the invention, as it allows the head to be raised or lowered to adapt it to the character of the ground over which the machine may be moving and the convenient accumulation of bundles on the rake, and at the same time allows the points of the teeth to be elevated or depressed without changing the position of the rake head supports on the wheels.

Lifting cables 17 are connected to the yokes and pass around sheaves 12, the ends of said cables being connected to a shaft 13 provided with an operating wheel 15 and journaled at its forward end in a bracket 13' that is mounted on the forward portion of the sweep or beam 21. The forward end of the sweep is secured to the cross bar 12' on which the sheaves 12 are mounted. When the shaft 13 is revolved, the cables 17 will be wound thereon and the yokes will be lifted to raise the rake head. This function of the lifting cables will be apparent from an examination of Fig. 2, in which it will be seen that the rake head and its connections are supported by the brackets 8 from the yokes 11 on the wheels 10, the connections of the brackets with the yokes being eccentric with respect to the hubs of the wheels, so that, when the yokes are lifted, the brackets and their connections will be raised also and correspondingly, when the yokes are lowered, the brackets and the rake head will also be lowered and in this way the teeth may be dropped to the ground to gather up the bundles. When the rear portions of the teeth are loaded, they may be raised and the forward parts thereof filled. The rear portion of the carrying teeth and the head whereon they are mounted are provided with upwardly projecting bars 27' which are hinged at 27 to the underside of the bar 12' and levers 31 are mounted on the rake head and extend therefrom on converging lines to a point above and adjacent the rear portion of the sweep 21. The rear ends of these levers are joined together to form a support to which the cable 18' is attached and passes under a pulley 18 mounted on the underside of the sweep 21 and from thence to a hub 16' journaled on the shaft 13 and provided with an operating wheel 16. A standard 13'' is mounted on the sweep 21 and projects upwardly therefrom and has a bearing for the rear end of the shaft 13 which projects forward and downwardly therefrom to its bearing in the bracket 13'.

Guards or fenders 25 are mounted in the rear of the wheels 10 to prevent the sheaves of grain from getting into the wheels. A toothed wheel 26' is mounted on the hub 16' and a dog 26 is mounted on the standard 13'' and has a foot lever 26'' within convenient reach of the driver on the platform 29 for withdrawing the dog from the teeth of the wheel 26' whenever it is desired to revolve the wheel 16 and change the position of the levers 31 to tilt the carrying teeth. A wheel 19' corresponding to the wheel 26' is mounted on the shaft 13 and a dog 19 engages the teeth of this wheel and is controlled by a foot lever 19''. A steering wheel 28 is mounted on the sweep 21 and has an operating lever 28'. The hubs of the wheels 10 are preferably journaled on one side in brackets 10' secured to an adjacent tooth. Intermediate of the teeth 5 I prefer to provide a series of shorter teeth 7 mounted in the cross bars 20 and 20' and terminating preferably at the rear ends of the extensions 6 of the main tines, these teeth 7 being for the purpose of picking up small sheaves and straw which the larger carrying teeth might miss and leave upon the field.

The rear portion of the sweep 21 is provided with the usual draft connections 24 and with neck yokes 24' for flexible connections 25'' with the bar 12'. When the machine moves forward to gather up the load, the operator through the hand wheel 16, may raise the rear portion of the tines, as shown in Fig. 2, while the tapered forward ends thereof will be close to the ground to pick up the sheaves or bundles thereon and direct them upon the supporting portion of the tines. I have found that the long tapered extensions of these tines will slip through the sheaves of the shock without any tendency to topple them over, which would be the case if the teeth had comparatively blunt ends. When the rear portion of the rake has been filled, the operator will raise it and allow the forward ends to slide along the ground until the forward portion of the rake is also loaded. Then the entire rake may be lifted out of contact with the ground and the machine moved across the field to the thresher or the stack.

It will be noted that by the revolution of the wheel 15 the yokes 11 may be oscillated to raise or lower bodily the forward portion of the machine while by revolving the wheel 16 the bars 31 may be raised or lowered to change the angle of the teeth with respect to the sweep and the cross bar 12' on which the rake head is mounted.

To prevent the rake head from dropping down on the ground through its hinge connection at 27 with the sweep, I provide a bar 31' pivoted at 31'' on the sweep and having a link connection 32' at its opposite end with the rake head. A bolt 32'' is mounted in said bar and is slidable in a socket in the sweep and is normally held in its raised position by a compression spring 33'. This spring resists the downward movement of the rake head and normally holds it in the position illustrated in Fig. 2. This spring 33' is sufficiently strong to hold the rake head in its raised position until such time as it is lowered to the ground by the movement of the supporting yokes.

I claim as my invention:

1. A shock and sheaf carrying machine comprising a draft frame having a rear carrying wheel, a rake pivotally connected with the forward portion of said frame, forward carrying wheels, yokes mounted for oscillation on the hubs of said forward carrying wheels, brackets mounted on said rake and eccentrically mounted on said yokes, and mechanism mounted on said draft frame for raising and lowering said yokes and mechanism for tilting said rake on said draft frame.

2. A sheaf and shock carrying machine comprising a draft frame having a rear supporting and guiding wheel and a cross bar secured to the forward portion of said frame, a rake pivotally connected with said cross bar, carrying wheels supporting said rake in front of said frame, means pivotally connecting said rake with said carrying wheels for raising and lowering said rake and the forward portion of said draft frame, and means mounted on said rake and said draft frame for tilting said rake on said cross bar.

3. A sheaf and shock carrying machine comprising a draft frame having a carrying wheel, a rake mounted on the forward portion of said draft frame and comprising cross bars and a series of tines mounted therein, said tines being flattened in form and having a centrally arranged reinforcing means and tapered in vertical and horizontal section from the rear to the forward ends of said tines, and said tines being provided with elongated metallic extensions for easily entering the bundles or shocks.

4. A shock and sheaf carrier comprising a draft frame, a rake pivoted thereon, carrying wheels for supporting said rake, yokes having pivots concentric with the axis of said wheels and mounted to straddle the wheels and project outwardly beyond the peripheries of said wheels, means connecting said rake with said yokes eccentrically with respect to said wheels, and means mounted on said frame for rocking said yokes to raise or lower said rake.

5. A shock and sheaf carrier comprising a draft frame having a rear caster wheel, a rake pivoted on the forward portion of said frame, carrying wheels supporting said rake and having crank connections therewith, means for operating said crank connections to raise said rake and the forward portion of said frame, and means for tilting said rake to raise or lower the forward ends of its teeth.

6. A shock and sheaf carrying machine comprising a frame, a rake head pivoted thereon, carrying wheels for said head, a series of tines mounted in said head and projecting forwardly therein, and metallic extensions mounted on said tines, said extensions being tapered and having elongated comparatively slender ends for entering the bundles without overturning the shock.

HENRY ARTHUR UNDERWOOD.

Witnesses:
 N. E. ODLAND,
 O. B. ANDERSON.